OSGOOD PLUMMER.
Improvement in Towel Racks.
No. 118,970. Patented Sep. 12, 1871.
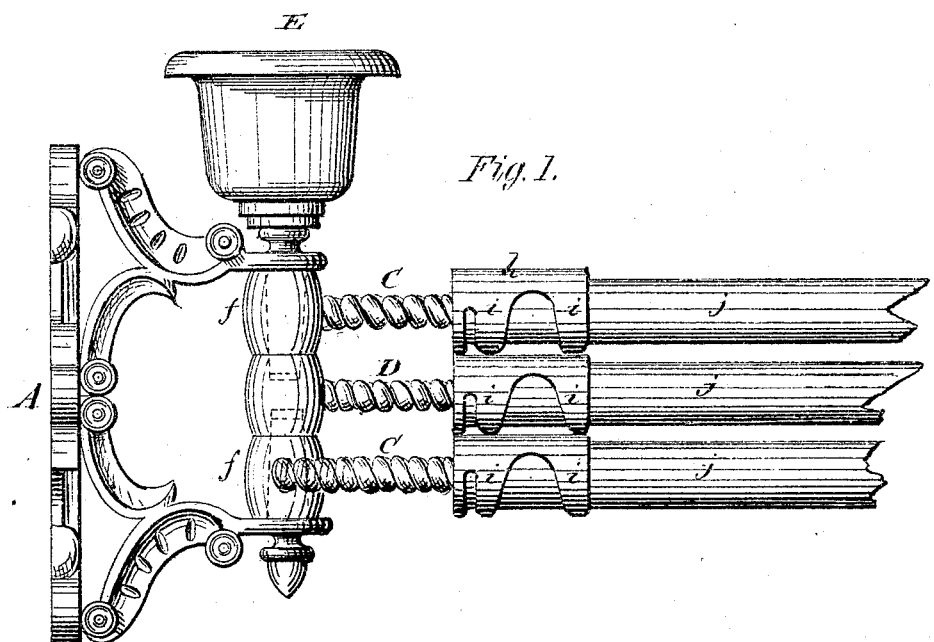
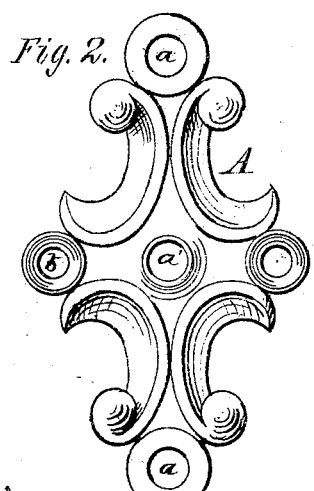
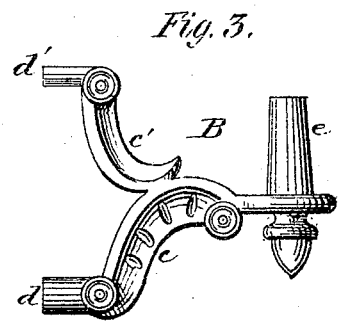
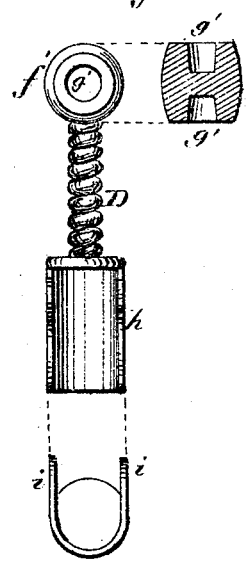
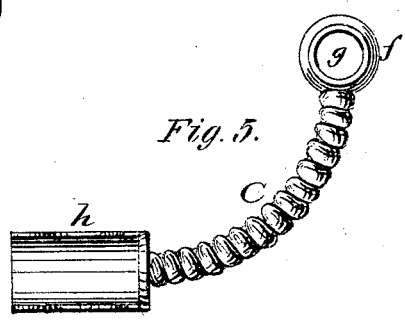
Witnesses.
Inventor:
Osgood Plummer.
by Prindle & Dyer
Attys.

UNITED STATES PATENT OFFICE.

OSGOOD PLUMMER, OF WORCESTER, MASSACHUSETTS.

IMPROVEMENT IN TOWEL-RACKS.

Specification forming part of Letters Patent No. 118,970, dated September 12, 1871.

*To all whom it may concern:*

Be it known that I, OSGOOD PLUMMER, of Worcester, in the county of Worcester and in the State of Massachusetts, have invented certain new and useful Improvements in Towel-Rack; and do hereby declare that the following is a full, clear, and exact description thereof, reference being had to the accompanying drawing making a part of this specification, in which—

Figure 1 is a view of the towel-rack complete; Fig. 2, a top-plan view of the base-plate; Fig. 3, a view of one of the supporting-brackets; Fig. 4, a plan view of the central rod-arm, with a separate sectional view of the pivotal end of the same; and Fig. 5, a view of one of the upper or lower rod-arms.

Like letters of like kinds denote corresponding parts in each figure.

The object of my device is the making of a towel-rack in such a manner that the separate pieces may be readily and strongly put together without screws, bolts, or rivets; and the invention consists in the construction, arrangement, and manner of putting together said separate pieces so as to accomplish the above-named result.

In the drawing, A represents the base-plate, as shown in Fig. 2, provided with openings $a$ at the ends, and $a'$ in the center, for the reception of the fastening-ends of the supporting-brackets, and with screw-holes $b$, for the purpose of securing the base-plate to the object to which it is designed to attach it. B represents one of the supporting-brackets, of which there are two precisely alike, shown particularly in Fig. 3. These brackets have an outer arm, $c$, and an inner arm, $c'$, the outer arm being furnished with a round, square, or other suitably-shaped end, $d$, and the inner arm with a half-round, triangular, or other suitably-shaped end, $d'$, of such a form, however, as to half fill the opening $a'$. The outer end of this bracket is provided with a spindle, $e$. The upper and lower rod-arms C, shown particularly in Fig. 5, are curved a little, and have pivotal ends $f$, provided with openings $g$ of a size to allow them to rotate upon the spindles $e$, and at their outer ends have plates $h$, provided with lugs $i$, for the purpose of being bent around, and securing in place the rods $j$. The central rod-arm D is straight, has an outer end similar to the other rod-arms, and a pivotal end, $f'$, with the openings $g'$ extending on each side nearly to the center.

The whole of this device, except the rods, is made of suitable metal, either cast or wrought, and the rods may be of wood or metal, as desired.

A match-cup, E, may be placed upon the device, as shown in Fig. 1.

In putting this towel-rack together the ends $d$ and $d'$ of the brackets are inserted in the openings $a$ and $a'$, the ends $d'$ being placed in the opening $a'$. The rod-arms C are placed upon the spindles $e$, which will project beyond them the depth of the openings $g'$. The rod-arm D is then placed in position, the ends of the spindles $e$ entering into the openings $g'$, and the whole device is secured together by hammering or upsetting a little the outer extremities of the ends $d$ and $d'$. The rods are secured in position by bending the lugs $i$ down over so as to embrace them.

I do not desire to confine myself to this manner of construction and fastening three rods, as it will be seen that the number may readily be increased to five, seven, or a greater number.

What I claim as new and as my invention is—

The towel-rack A, B, C, and D, constructed, arranged, and secured together substantially as described and shown.

In testimony that I claim the foregoing I have hereunto set my hand this 27th day of July, 1871.

OSGOOD PLUMMER.

Witnesses:
 CHARLES A. MERRILL,
 W. A. GILL.